United States Patent [19]
Boyer

[11] 3,769,167
[45] Oct. 30, 1973

[54] CONCURRENT PRODUCTION OF A PLURALITY OF ENZYMES

[75] Inventor: London D. Boyer, Ponca City, Okla.

[73] Assignee: Continental Oil Company, Ponca City, Okla.

[22] Filed: May 24, 1971

[21] Appl. No.: 148,256

[52] U.S. Cl.................. 195/66 R, 195/65, 195/111
[51] Int. Cl............................................ C07g 7/028
[58] Field of Search..................... 195/65, 111, 66 R

[56] References Cited
UNITED STATES PATENTS

| | | | |
|---|---|---|---|
| 3,616,232 | 10/1971 | Anderson et al.................. | 195/66 R |
| 3,513,073 | 5/1970 | Maurernay et al................ | 195/66 R |
| 3,654,086 | 4/1972 | Ziffer.................................... | 195/63 |
| 3,031,380 | 4/1962 | Minagawa et al................. | 195/66 R |
| 3,616,234 | 10/1971 | Komagata et al................. | 195/66 R |
| 3,655,510 | 4/1972 | Tanaka et al....................... | 195/111 |

Primary Examiner—David M. Naff
Attorney—Joseph C. Kotarski, Henry H. Huth, Robert B. Coleman, Jr., Gerald L. Floyd, Carroll Palmer and Kemon, Palmer & Estabrook

[57] ABSTRACT

A plurality of enzymes are concurrently produced by a process and system in which the physical facilities employed are integrated at a plurality of locations to permit certain common equipment and reactants to be used during the concurrent production of the several enzymes.

12 Claims, 3 Drawing Figures

INVENTOR
LYNDON D. BOYER

BY Gerald L. Floyd
ATTORNEY

3,769,167

CONCURRENT PRODUCTION OF A PLURALITY OF ENZYMES

BACKGROUND OF THE INVENTION

1. Field of the Invention

This invention relates to the production of enzymes, and more particularly, to the concurrent production of a plurality of species of enzymes.

2. Brief Description of the Prior Art

It has been recently proposed to add various enzymes to detergent compositions for the purpose of benefiting from the stain removing characteristics of such enzymes. The major categories of enzymes suggested for this purpose, and the stains which they attack and are effective in removing, are lipase, used for removing fat stains; protease, used for removing protein stains; amylase, used for removing starch stains; and hydrocarbon decomposing enzymes for removing oily stains. The described enzymes, as well as others employed for other purposes, are generally produced by fermentation processes in which a suitable substrate material, which is usually chemically related to the type of stain which the enzyme will attack, provides a feed source for a bacterial organism of a suitable type. The enzyme is a coproduct of the biosynthesis process which, after a suitable period of time, is completed in the fermentation mixture containing the substrate, organism and a nutrient solution. Upon completion of the bio-synthesis, the enzyme product is isolated from the substrate residue and bacterial debris by precipitation, filtration or other suitable techniques, and is then dried for ultimate usage.

The various types of enzymes heretofore manufactured for addition to detergents and for other usage have been made in facilities which are generally set up and equipped to produce only one type of enzyme, rather than concurrently producing a plurality of types of these bio-chemical catalysts. The biosynthesis procedures and equipment employed have been customized for the accomodation of the manufacturing requirements of the individual enzyme products sought, and there have therefore existed separate feed sources, separate fermentation facilities, separate nutrient solution drums and separate facilities for precipitating or filtering the enzyme from the culture mixture in ordet to isolate the enzyme.

BRIEF DESCRIPTION OF THE PRESENT INVENTION

The present invention provides an improved process and system for concurrently producing a plurality of enzymes. Certain physical facilities and apparatus heretofore customized in the production of individual strains or species of enzymes have been integrated to permit a common step to be employed in the production of two or more different enzymes, and capital investment and physical facilities for the production of the several enzymes are substantially reduced. The nutrient solutions employed in the cultures traditionally used for producing the enzymes are derived from a common source, and common separatory techniques, such as use of a common solvent source for enzyme precipitation, and recirculation of such common solvent, are employed. End products constituting a mixture or blend of a plurality of enzymes, are derived from the process and system of the invention.

Broadly described, the process of the present invention comprises preparing a plurality of biosynthesis systems each containing substrate feedstock materials and associated micro-organisms specifically active with respect thereto, and each selected to produce a preselected enzyme; adding a common nutrient solution containing a nitrogen-containing compound and mineral nutrients to each of the biosynthesis systems from a common source; and then, after a suitable fermentation period, separating the enzymes produced by the several biosynthesis systems from the substrate feedstock materials, micro-organisms, and nutrient solution.

In a preferred embodiment of the invention, a mixture of substrate feedstock materials susceptible to specific attack by several biological species is fed to a common fermentation zone, and a suitable inoculant containing these species of bacteria is also fed to this zone, following addition to the zone of a nutrient solution containing sufficient nitrogen and nutrient minerals to facilitate bacterial digestion of the substrate mixture and concurrent production of several enzyme species as a result of the activity of several bacteria on the various substrate materials in the feedstock mixture. The mixed enzyme products are then commonly recovered by special filtration methods or co-precipitation, and are dried and blended to the desired enzymatic activity.

An important object of the present invention is to provide a process by which a mixture of several enzymes can be concurrently produced, using certain common reactants and common reaction facilities or common process zones whereby capital investment, and processing time and difficulties are minimized.

Another object of the invention is to produce a mixture of enzymes having specific stain removing activity, which mixture can be used without further segregation as an additive to detergents to derive the collective stain removal effects of the several enzymes in the mixture.

Other objects and advantages will become apparent as the following detailed description of the invention is read in conjunction with the accompanying drawing which illustrates the invention.

DETAILED DESCRIPTION OF THE PRESENT EMBODIMENTS OF THE INVENTION

Various substrate feedstock materials can be used to produce the various enzymes. To produce the enzyme protease a feedstock high in protein may be used, such as wheat germ, soy bean meal, yeast cells, hydrolyzed blood or hydrolyzed meat protein. For the enzyme amylase a feedstock high in starchy material may be used, such as corn meal, starch, dextrose, sucrose or molasses. For the enzyme lipase a glyceride feedstock may be used such as coconut oil or tallow fat. For hydrocarbon decomposing enzymes the substrate feedstock may be a paraffinic hydrocarbon such as n-paraffins, paraffinic kerosene or paraffinic gas oil.

Figure 1:
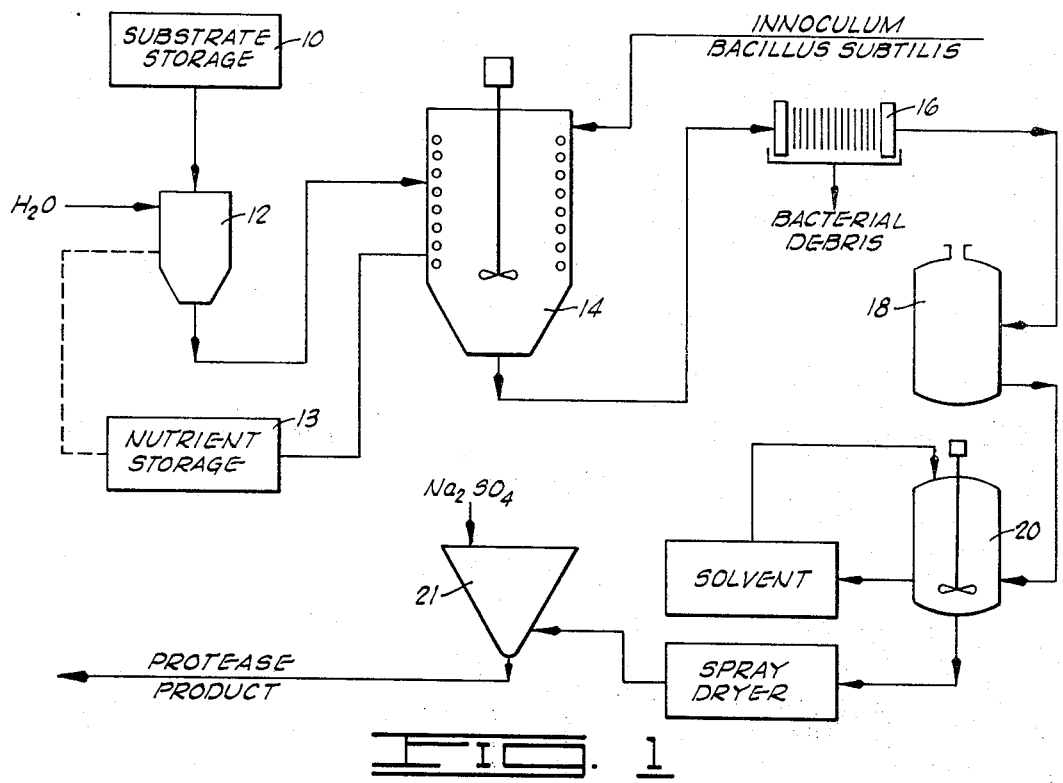
FIG. 1 is a schematic flow diagram illustrating the process steps and apparatus typically heretofore utilized to produce a single enzyme species.

A processed low diagram illustrating typical practice in the manufacture of individual enzymes, as such manufacture has been heretofore carried out appears in FIG. 1 of the drawings. Storage for a substrate feedstock material is indicated by reference numeral 10. Considering, for discussion purposes, the production of the enzyme protease by the use of the illustrated system, the substrate feedstock material stored in the storage tank 10 may be a particulate mixture of ground corn meal and wheat germ in which the weight ratio of corn mean to wheat germ is about 2:1. This material is maintained under conditions in the storage tank 10 such that it does not deteriorate and is protected from moisture until usage.

The substrate feedstock material is fed to a blender 12 where it is mixed with a small amount of water, or in some utilizations may be mixed with an aqueous nutrient solution from a storage facility 13. The aqueous nutrient solution, where added, will contain a material constituting a nitrogen source, in which nitrogen is in available form for usage by a micro-organism which is to excrete the desired enzyme as it digests the substrate feedstock material. For reasons of economy, it is preferable to employ inorganic nitrogen compounds such as ammonia, ammonium hydroxide, and salts thereof such as ammonium phosphate and ammonium citrate. Since phosphate ions are an important nutrient mineral, it is convenient to use ammonium phosphate as a nitrogen source in the aqueous nutrient solution, because of availability therefrom of both nitrogen and phosphorous, and also because of the more suitable pH effect imparted by this substantially neutral salt to the aqueous nutrient solution. The nutrient solution will also contain various minerals in trace amounts, such as potassium, sulphur, iron, manganese and magnesium. A suitable source of such trace minerals often used in the biosynthesis aqueous nutrient solutions employed for enzyme production is a material marketed by the Lake Products Company of St. Louis, Missouri, under the tradename "Sea Salts."

The aqueous nutrient solution is maintained at a pH of from about 4.5 to about 9.5, and at a temperature of from about 25°C to about 60°C, and is added to the substrate feedstock material at this pH and temperature. The amount of the aqueous nutrient solution which is mixed with the dry, particulate substrate material is preferably from about 90 weight per cent to about 98 weight percent.

After mixing the aqueous nutrient solution with the substrate feedstock material, the medium is then fed to a fermentation zone represented by the fermenter drum 14 depicted in FIG. 1. In the fermenter drum 14, a suitable anti-foam agent is added to the biosynthesis medium in a small quantity, and the contents of the fermenter drum are subjected to continuous agitation while air is bubbled through the medium.

At a separate location, and using techniques well understood in the art, there is prepared an inoculum containing viable aerobic micro-organism cells which will attack and feed on the substrate feedstock material to yield as excretory products, the enzyme desired. For the production of protease, a strain of spore-forming Bacillus Subtilis is provided, and the inoculum, containing a high concentration of cells of this bacteria, is added to the fermenter drum 14 in a ratio of about 10 percent by volume based on the total final liquid volume in the fermentation drum 12. The pH of the biosynthesis system in the fermentation zone is maintained from about 5 to about 9.5, with a pH of 6 to 8 being preferred. The temperature in the fermentation zone is maintained between about 25°C and about 60°C, with from 30°C to 50°C being preferred.

It should be here pointed out that, as an alternative to the addition of the nutrient solution to the blender 12 prior to charging the biosynthesis medium to the fermenter drum 14, the nutrient solution may instead be added to the substrate feedstock material (after the latter has been slurried in water) in the fermenter drum in advance of the time that the inoculum culture is added thereto. Blending of the aqueous nutrient solution with the feedstock in the proportions previously described is then carried out in the fermenter.

After a suitable residence time in the fermenter drum 14, which will range from about 60 hours to about 80 hours, and after the concentration of enzyme product therein reaches a maximum, the contents of the fermenter drum are drawn off and passed to various suitable enzyme recovery devices. In the illustrated flow diagram, these include a suitable filter device, which may be a plate and frame filter 16, or a rotary vacuum filter. The filter device 16 functions to remove from the product mixture, bacterial debris, substrate feedstock residue and proteolytic by-products. The filtrate is a clear solution containing the enzyme product sought, and certain micron sized breakdown products of the bacteriological reaction.

This clear filtrate solution may then beneficially be carefully concentrated in volume by the use of one or more low temperature evaporators 18. The enzyme is then precipitated from the concentrated filtrate solution by adding a suitable water soluble organic solvent, such as alcohol or acetone, in a precipitation zone represented by the precipitation tank 20 depicted in FIG. 1. After precipitation, the organic solvent is recovered and returned to storage. As contrasted with precipitation in the manner described, it should be pointed out that the filtrate solution may, alternatively, be subjected to ultra-filtration or "salting-out" techniques for the purpose of recovering the concentrated enzyme.

After the enzyme has been precipitated, or recovered by ultra-filtration, the precipitate or filter cake is carefully dried by spray drying, or other suitable moisture removal technique, to form a dry powder. The dry powder is then blended in a blender device 21 with an inert diluent material in particulate form to adjust the activity of the enzyme product to the level desired. Typically, sodium sulfate is used as the diluent employed in blending to the desired enzymatic activity.

Having described a typical procedure heretofore in use for producing protease as an enzyme which may be used, for example, for removing milk or other protein-based stains from fabrics, the present invention will now be described as two embodiments thereof are schematically illustrated by the flow diagrams shown in FIGS. 2 and 3. As has been previously pointed out, the present invention combines certain steps and equipment which would conventionally be used separately in the separate production of a plurality of enzymes, such combination enabling the concurrent production of the enzymes in admixture with each other, and thus yielding a product highly suitable for use in detergent compositions, or in other environments wherein the multiple selective activities of a plurality of enzymes are desirable.

Figure 2:
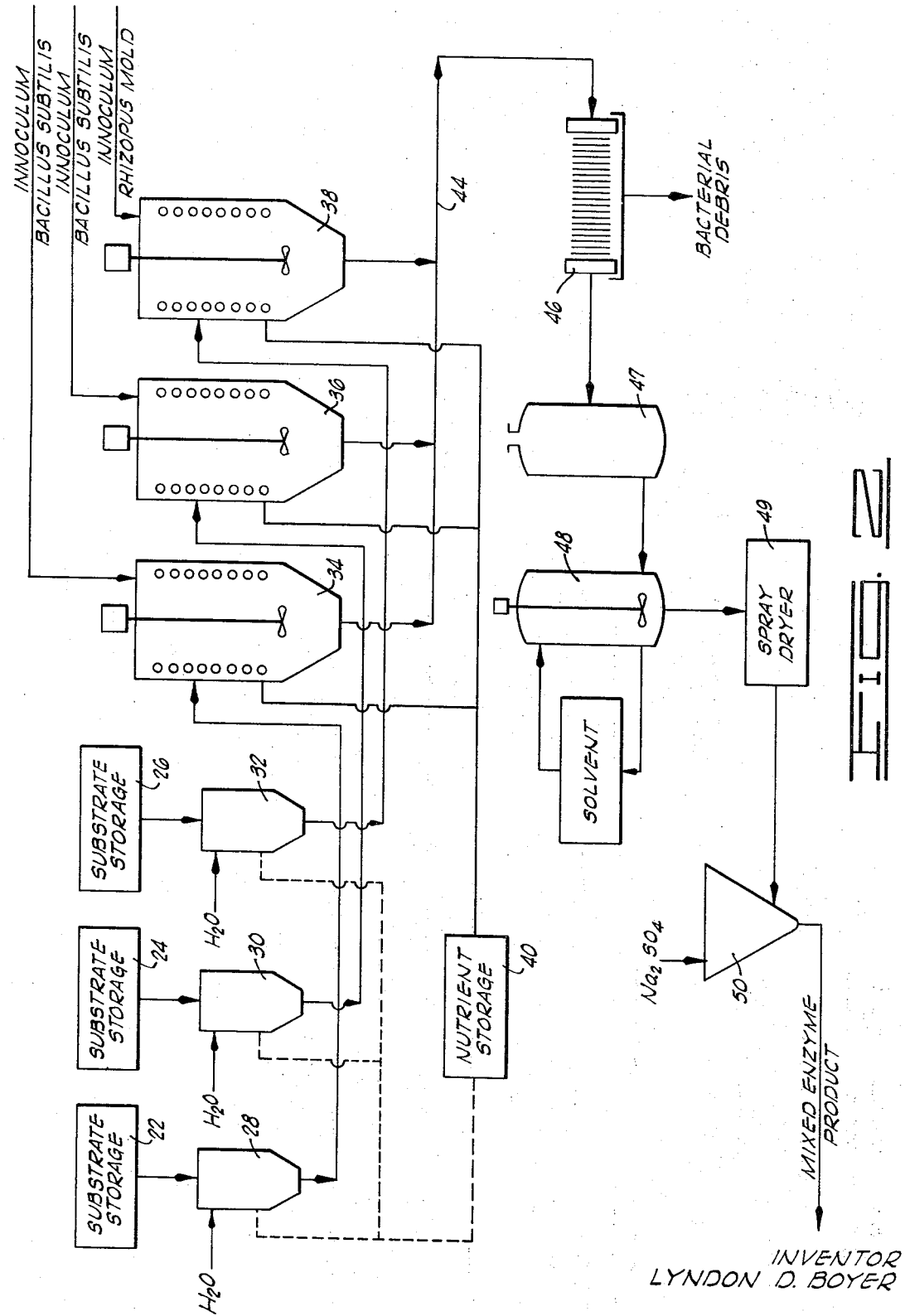
FIG. 2 is a schematic flow diagram of the general type illustrated in FIG. 1, but depicting the practice of one embodiment of the present invention.

Referring to FIG. 2, there is here shown a flow diagram depicting one method of practicing the present invention to concurrently produce lipase, protease and amylase in a single enzymatic product. This product, by reason of the selective activity in stain removal of the three enzymes contained therein, can be advantageously blended in proper proportion with a detergent composition to impart to the composition marked activity in the removal of stains derived from fatty, proteolytic and starchy sources.

At the outset of the process depicted in FIG. 2, three storage drums or tanks 22, 24 and 26 are provided for the purpose of individually containing suitable substrate feedstock materials for the production of the three types of enzymes which are to characterize the product mixture. Thus, the storage tank 22 will contain, for example, corn meal and wheat germ in a weight ratio suitable for the production of protease in the general manner described in the foregoing discussion in reference to FIG. 1. Storage tank 24 will contain a ground grain high in starch content for the purpose of yielding amylase enzyme when subjected to appropriate bacteriological attack. Actually, a very suitable substrate feedstock material which may be used for the production of amylase is a mixture of wheat germ and corn meal in which the wheat germ and corn meal are present in a 2:1 weight ratio (the inverse of the weight ratio which is used in the production of protease).

In the drum 26, there is stored a substrate feedstock material which is suitable for the production of lipases which will attack fatty (glyceride) stains. Typically, this may be a seed oil, such as coconut oil. Another useful type of enzyme which will attack paraffinic oil and grease stains, can also be alternatively produced along with the protease and amylase, and in such event, a normal paraffin hydrocarbon feedstock is contained in the storage drum 26. It is also possible to provide a fourth storage drum (not shown) for the purpose of concurrently producing the enzyme which will attack the paraffin hydrocarbon stains, along with the other three enzyme types described.

The several feedstocks from the storage drums 22, 24 and 26 are charged to blenders 28 and 30 and 32 respectively, and are there moistened with water to the extent desired to produce a pumpable slurry. The mixtures from the blenders 28, 30 and 32 are then charged to individual fermenter drums 34, 36 and 38. The conditions maintained in each of the fermenter drums 34, 36 and 38 are optimized with respect to the particular type of biosynthesis to be carried out therein. Thus, in the fermenter drum 34, the conditions previously described herein for the production of protease will be established, and an inoculum culture containing a high concentration of viable Bacillus Subtilis cells will be charged to the fermenter drum at the commencement of the fermentation.

In the case of the fermentation carried out in the fermenter drum 36, the pH and temperature conditions in this zone are adjusted for optimum production of amylase. When the substrate feedstock material is corn meal and wheat germ in the previously described ratio, the same type of inoculum can be utilized for the production of the amylase as is employed in the production of the protease enzyme. Thus, a viable inoculum of Bacillus Subtilis cells is charged to the fermenter drum 36. In the production of the lipase enzyme in the fermenter 38, an inoculum containing Rhizopus mold cells is charged to the fermenter, and the pH and temperature conditions are adjusted to promote the production of the lipase enzyme as the mold cells feed on the coconut oil substrate.

If a hydrocarbon-decomposing enzyme is desired, n-paraffin substrate is employed as previously noted. The inoculum might typically contain Candida lypolitica yeast.

As shown in FIG. 2, the aqueous nutrient solution which is employed in the process here depicted is derived from a common nutrient solution storage source indicated by the storage tank 40. A common nutrient solution source for the three fermenter drums 34, 36 and 38 can be utilized because of the relatively common requirements of the fermentation processes involved, insofar as the content of the nutrient solution is concerned. Thus, a typical nutrient solution which may be maintained in the storage tank 40 and charged to the fermentation tanks 34, 36 and 38 contains from 90 to 96 weight percent water, a sufficient amount of ammonium phosphate to yield from about 0.05 weight percent to 0.25 weight percent nitrogen, based on the total weight of the components in the biosynthesis systems in each of the fermenter drums, and trace amounts of potassium sulphate and inorganic minerals including iron, manganese and magnesium. Other minerals such as nickel, cobalt and calcium may also be present.

The pH of the aqueous nutrient solution is in the range from about 4.5 to about 8, with a pH from about 4.5 to about 7.5 being preferred. The nutrient solution is maintained at a temperature of from about 20°C to about 60°C, with a temperature of from 30°C to 50°C being most preferred. The described nutrient solution can be suitably used for mixing with the substrate feedstock material in the fermentation zones prior to the time at which the bacteria-containing inocula are charged to the respective fermentation zones.

After completion of fermentation within the several fermentation zones, the contents (broths) from each of the fermenter drums 34, 36 and 38, are discharged to a common line 44, and the mixture passes through this line to a suitable filtration system as represented schematically by the filter 46. It will, of course, be apparent that the discharge of effluent broth from the several fermenter drums 34, 36 and 38 is preferably carried out concurrently, and it is therefore desirable to commence the discharge from the several drums at a time after the slowest reaction in any one of the three drums have been completed (that is, maximum enzyme production has been realized). The times at which the fermentations in the several fermenter drums yield maximum enzyme product are close to each other, and no significant loss in the production of any one of the enzymes results from this procedure. In the filter 46, the bacterial debris, by-product particles and residue from the substrate feedstock are filtered from the combined streams from the three fermenter drums to yield a clear solution of the three enzymes.

The filtrate is then passed via a low temperature evaporator 47 to a precipitator unit 48 of the type hereinbefore described where a suitable water soluble organic solvent, typically acetone, is used to precipitate the enzymes from solution. The thus co-precipitated enzymes are then removed to a spray drying device 49 where they are carefully dried to a moisture content not exceeding about 6 weight percent water. The spray dryer utilized is preferably operated at an inlet air temperature of between about 130°C and 145°C, and at an outlet air temperature of from about 70°C to about 85°C.

After spray drying, the mixed enzymes are then conveyed to a blender device 50 where a solid, particulate diluent material, such as sodium sulfate, is utilized to reduce the specific enzyme activity to a desired level. This activity, which is typically expressed in Delft or Tyrosine Units, is adjusted to meet the requirements of a particular end usage, but will, for example, typically be in the range of from about 40,000 Delft Units to about 200,000 Delft Units per gram of the mixed enzyme product (or from about $1.2 \times 10^6$ Tyrosine Units to about $9 \times 10^6$ Tyrosine Units per gram) where a detergent usage is contemplated. To achieve this activity level, the mixed enzyme product is typically diluted with the inert diluent material in a weight ratio of diluent to enzyme product of from about 7:1 to about 15:1.

Figure 3:
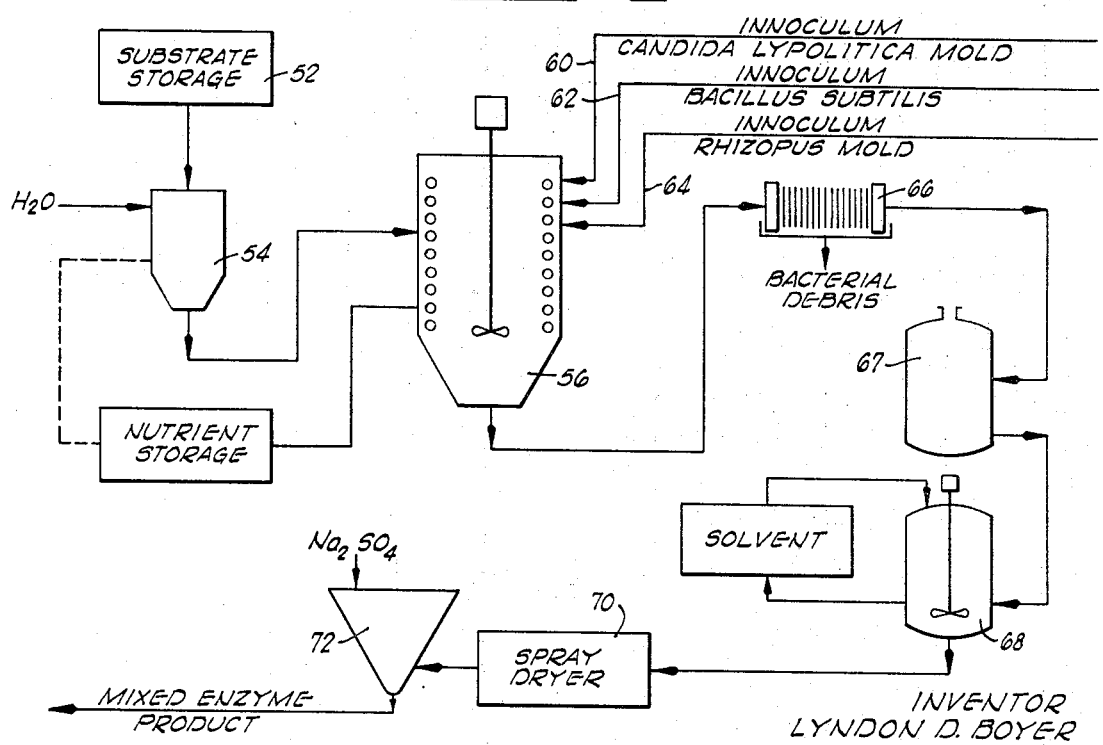
FIG. 3 is a schematic flow diagram depicting the practice of another embodiment of the present invention.

In FIG. 3 of the drawings, a preferred embodiment of the present invention is schematically illustrated. Here, a storage tank 52 is provided for the containment of substrate feedstock meterials which, by addition of appropriate micro-organisms thereto in a common fermentation zone, can be used to concurrently or simultaneously produce a plurality of desired enzymes. Thus, a typical blend of substrate feedstock materials stored in the storage tank 52 will include a material which will provide food for certain selected bacterial micro-organisms which will excrete, for example, lipase. Other material in the blended feedstock will respond to another type of bacterial activity to yield protease. Still another component of the blend of substrates stored in the storage tank 52 will respond to selective bacterial activity to produce amylase. The substrate feedstock mixture may also contain n-paraffin hydrocarbons for response to an organism such as Candida lypolitica yeast to produce a hydrocarbon-decomposing enzyme. The substrate feedstock blend of the type described is mixed with water (and, if desired, with a common nutrient solution of the type hereinbefore described) in the blender 54, and the slurry then charged to a fermentation zone located in the fermenter drum 56. Then, during aeration and agitation of the medium disposed in the fermenter drum 56, three separate inoculums are preferably concurrently charged to the fermenter from the inocula streams 60, 62 and 64.

The inocula streams 60, 62 and 64 include viable cultures of three micro-organism species selected for their specific activity on the mixed substrate feedstock materials which have been charged to the fermenter drum 56. The fermenter drum 56 is operated at conditions of temperature and pH such that the several bacterial micro-organisms introduced in the three inocula will individually, yet concurrently, operate upon their chosen constituents of the blended feedstock to produce a plurality of enzymatic products. Thus, there concurrently proceed within the fermentation zone, the fermentations characteristic of each of the three micro-organisms, and its respective substrate material, to yield several types of enzymes having the specific enzymatic activities desired in the final product blend.

After the fermentation in the fermentation zone has progressed to the level of maximum collective enzyme production, the contents of the fermenter drum 56 are removed and charged to a filter device 66 in the manner hereinbefore described. Here, bacterial debris, undigested portions of solid substrate material and undesirable by-products are removed by filtration to produce an enzyme-containing filtrate solution. This is then charged via evaporator 67 to the precipitator device 68, where acetone may be used to co-precipitate the several enzymes. The mixed enzymes are then dried in dryer 70 and blended in blender 72 to a specific enzymatic activity in the manner hereinbefore described.

It will be seen from the foregoing description that a process is proposed by which a mixture of several enzymes having differing stain removal activities can be concurrently produced in a common process stream proceeding through common locations in which various common steps of the process are concurrently performed upon the stream.

The following example will further illustrate the practice of the invention in accordance with the flow diagram depicted in FIG. 3 for the purpose of concurrently producing protease, amylase and lipase and hydrocarbon decomposing enzymes in a blend of controlled activity sufficient for addition to a detergent composition. A mixture of substrate feedstock materials is made up to contain coconut oil, wheat germ, corn meal and selected paraffin hydrocarbons in a 30:30:30:10 weight ratio. In this form, the feedstock material is a heavy pumpable slurry. The feedstock blend is maintained at a temperature of about 10°C in the storage tank 52 shown in FIG. 3.

Upon start-up of the process, the mixture is charged in a suitable batch amount to the blender 54, and is here mixed with an aqueous nutrient solution which contains 3 weight percent ammonium phosphate, 0.3 weight percent calcium carbonate, 0.4 weight percent SEA SALTS (hereinbefore described), and about 96 weight percent water. The aqueous nutrient solution as thus composed, is blended with the mixed substrate feedstock materials from the storage tank 52 in a weight ratio of about 24:1 nutrient solution to the blended feedstock material. The biosynthesis medium, as thus composed, is charged to the fermenter drum 56 where it is cooled to 31°C. About 100 parts per million of a suitable foam suppressant or anti-foam material is added to the mixture in the fermenter drum 56, and air is then bubbled through the medium at a rate of about 0.6 volume of air per volume of the biosynthesis medium per minute. Suitable impellers are positioned in the fermenter drum 56 and continuously agitate the medium. The pH in the fermenter drum 56 is adjusted and maintained throughout the fermentation procedure at between 4.5 and 7.0.

When the temperature, pH and air flow conditions in the fermenter drum 56 have been adjusted in the manner described, three streams of inocula are charged to the fermenter drum, each containing a 24-hour old culture of a selected bacterial micro-organism. For the purpose of producing protease and amylase by the activity of one of these micro-organsims upon the grain germ portion of the substrate feedstock, Bacillus Subtilis bacteria are employed in one inoculum stream, and the total amount of this inoculum charged to the fermenter is about 4 percent by volume of the final total fermentation slurry volume. In another of the inoculum streams, a 24-hour old culture of Rhizopus mold is employed, and the amount of this stream charged to the fermenter drum 56 is about 5 percent by volume of the final fermentation slurry volume. Finally, the third inoculum stream contains viable *Candida lypolitica* bacteria, and the amount of this inoculum charged to the fermenter is about 3% by volume of the final fermentation slurry volume.

The fermentation is allowed to proceed within the fermenter drum 56 for a period of between 60 and 70 hours. Termination of the fermentation is signalled by the reaching of maximum enzyme activity in samples of the broth which are periodically removed from the fermenter drum 56. Upon completion of the fermentation as determined in the manner described, the entire broth or medium is discharged from the fermenter drum and passed to the filtration unit 66 shown in FIG. 3. Preferably, the broth from the fermentation cell is prepared for filtration by the addition of small amounts of cationic and anionic polyelectrolytes thereto. These materials are added in amounts equivalent to about 1.6 volume percent, and about 100 parts per million by weight, respectively. A solid particulate admix material is also preferably added to the effluent from the fermenter drum 56 to aid in filtration.

After passage through the filter device 66, a clear filtrate solution is yielded which contains the mixed enzymes produced by the concurrent activity on the substrate mixture of the three inocula cultures described. The filtrate is then charged to the precipitator device 68, where an amount of acetone equivalent to about 85 volume percent is added to the clear filtrate. The mixed enzymes are readily co-precipitated upon addition of the acetone, and the wet precipitate is removed and passed to the spray dryer. The co-precipitated enzymes enter the dryer 70 at an inlet air temperature of about 120°C, and are discharged from the dryer at an outlet air temperature of about 70°C. The resultant enzyme product is a free-flowing, off-white powder which does not excessively dust.

After drying of the mixed enzymes, the enzymes are blended with sodium sulfate in a quantity sufficient to reduce the specific enzyme activity to a desired level.

Although certain preferred embodiments of the present invention have been herein described in order to provide an example of the manner in which the invention is to be practiced in accordance with the principles utilized, it will be understood that various changes and innovations in the described procedure can be effected without departure from the principles underlying the invention. For example, in some instances, and for the purpose of producing certain types of enzymes, a mixed or blended substrate feedstock may be utilized as described in referring to FIG. 3 of the drawings, but this feedstock is charged to three different, segregated, fermentation zones. Here, a common aqueous nutrient solution will be charged to the three fermentation zones, and three different inocula cultures which are maintained segregated from each other at all times will be charged to the three fermentation zones. The enzymes produced in these three zones can then be re-blended in a merged discharge stream, and subjected to common filtration, followed by co-precipitation, drying and blending, to give a mixed enzyme product. This procedure will offer advantages where the particular microorganisms which are to be used upon the mixed substrate feedstock material are antagonistic or incompatible with each other, and cannot effectively operate in a common fermentation situs. This will be characteristic of some types of fermentation procedures for the purpose of producing certain enzymes.

It will also be apparent that in its broadest form, the process of the invention can be carried out continuing to use segregated, individual substrate feedstock mixtures charged to isolated fermentation zones, but using a common nutrient solution from a common source for carrying out the fermentation in the three isolated fermentation zones. The products may then be individually filtered, and the filtrates then combined and subjected to the co-precipitative activity of a common precipitating organic solvent. The co-precipitate thus produced is then dryed and is activity blended in the manner described.

Changes and innovations of these types, as well as others, are considered to be within the broad concept of the present invention, which broadly contemplates the utilization of one or more common reactants, or the performance in a concurrent fashion of one or more common steps, for the purpose of producing a mixed enzyme product.

What is claimed is:

1. A method for preparing a mixture of enzymes comprising:

preparing a mixture of substrate feedstock materials one of which is high in protein, one of which is high in starchy material, one of which is high in glycerides, and one of which is high in paraffin hydrocarbons which substrate feedstock materials are ingestible by a plurality of pre-selected micro-organisms, each capable of excreting a desired enzyme;

adding to said mixture of substrate feedstock materials, an aqueous nutrient solution containing nitrogen in available form for usage by said pre-selected micro-organisms and trace amounts of nutrient minerals;

adding to said mixture of substrate feedstock materials in said aqueous nutrient solution, a micro-organism inocula containing Bacillus Subtilis micro-organism cells capable of ingesting the substrate feedstock material high in protein, a micro-organism inocula containing Bacillus Subtilis micro-organism cells capable of ingesting the substrate feedstock material high in starchy material, Rhizopus mold micro-organism cells capable of ingesting the substrate feedstock material high in glycerides, and Candida lypolitica mold micro-organism cells capable of ingesting the substrate feedstock material high in paraffin hydrocarbons, said addition of inocula being carried out in a fermentation zone maintained at a pH and temperature adjusted to promote fermentative feeding of the several micro-organisms on the mixture of feedstock materials;

then, after the passage of a fermentation time period adequate to yield a plurality of enzymes of desired species, discharging the fermentation mixture and product from the fermentation zone; and separating the enzyme products of fermentation from bacterial debris, substrate feedstock residue and nutrient solution.

2. A process as defined in claim 1 wherein the nitrogen-containing compound in said nutrient solution is ammonium nitrate.

3. A process as defined in claim 1 and further characterized as including the steps of drying the mixture of enzymes separated from the substrate feedstock materials, micro-organisms, and nutrient solution; and blending the dried enzyme mixture with an inert diluent material to produce a blend having a pre-selected enzymatic activity.

4. A process as defined in claim 1 wherein during said fermentation period the temperatures of said fermentation environments are maintained between about 25°C and about 60°C.

5. The process defined in claim 1 wherein said fermentation period is from about 60 hours to about 80 hours.

6. The process defined in claim 1 wherein said aqueous nutrient solution has a pH of from about 4.5 to about 9.5.

7. A process as defined in claim 1 and further characterized as including the steps of drying the mixture of enzymes precipitated from said broths to a water content not exceeding 6 weight percent; and blending the dried enzyme mixture with sodium sulfate to produce a blend having a pre-selected enzymatic activity.

8. The process defined in claim 7 wherein said aqueous nutrient solution has a pH of from about 4.5 to about 9.5.

9. The method defined in claim 1 wherein separation of the enzyme products from bacterial debris, substrate feedstock residue and nutrient solution is accomplished by:

filtering the solid materials in the fermentation mixture and products from the liquid therein; then recovering the enzyme products of fermentation from the filtrate liquid.

10. A process for concurrently preparing a plurality of enzymes comprising:

preparing four biosynthesis systems respectively containing:

a. Bacillus Subtilis micro-organism cells and a substrate feedstock material including a material high in protein, said micro-organism cells and material high in protein being present in proportions effective to produce protease enzymes upon fermentative digestion of said feedstock material;

b. *Bacillus Subtilis* micro-organism cells, and a substrate feedstock material including a starchy material, said micro-organism cells, and starchy material being present in proportions effective to produce amylase enzymes upon fermentative digestion of said feedstock material;

c. Rhizopus mold micro-organism cells and a substrate feedstock material including a glyceride, said micro-organism cells, and glyceride being present in proportions effective to produce lipase enzyme upon fermentative digestion of said feedstock material; and d. Candida lypolitica mold micro-organism cells and a substrate feedstock material including a paraffin hydrocarbon, said micro-organism cells and paraffin hydrocarbon being present in proportions effective to produce a hydrocarbon-decomposing enzyme upon fermentative digestion of said feedstock material;

providing from a common source, a common aqueous nutrient solution containing a nitrogen-containing compound wherein the nitrogen is in available form and mineral nutrients at the locus of each of said biosynthesis systems to constitute four fermentation environments conductive to the concurrent fermentative production of the four enzymes produced by said micro-organisms;

then, after a period of fermentation action by the four micro-organisms upon their respective feedstock material, collectively and concurrently separating the enzymes produced by the four micro-organisms from the substrate feedstock materials, micro-organisms and nutrient solution by:

combining the fermentation broths produced by the several fermentations;

filtering the combined fermentation broths to remove feedstock material residue and micro-organism debris therefrom; and then, adding an organic precipitation solvent to said broths to precipitate the several enzymes therefrom;

drying the mixture of enzymes precipitated from said broths to a water content not exceeding 6 weight percent; and blending the dried enzyme mixture with an inert diluent material to produce a blend having a pre-selected enzymatic activity.

11. The process defined in claim 10 wherein the amount of said aqueous nutrient solution provided at the locus of each biosynthesis system is from about 90 weight percent to about 98 weight percent based on the total weight of the substrate feedstock material and aqueous solution in each biosynthesis system locus.

12. A process as defined in claim 10 wherein said organic precipitating solvent is acetone.

* * * * *